UNITED STATES PATENT OFFICE.

EBEN N. HORSFORD, OF CAMBRIDGE, MASSACHUSETTS.

IMPROVEMENT IN THE MANUFACTURE OF A NON-HYGROSCOPIC PULVERULENT ACID PHOSPHATE.

Specification forming part of Letters Patent No. 104,034, dated June 7, 1870.

*To whom it may concern:*

Be it known that I, EBEN N. HORSFORD, of Cambridge, county of Middlesex and State of Massachusetts, have invented a certain new and useful Improvement in the Manufacture of a Non-Hygroscopic Pulverulent Acid Phosphate, for use in the preparation of farinaceous food, &c., of which the following is a specification:

To prepare my improved acid phosphate for use in making bread and other farinaceous food, I proceed as follows:

I take the acid phosphate of lime liquor, which consists of a mixture of biphosphate of lime and free phosphoric acid, as described in my patent granted April 22, 1856, and extended for seven years from April 22, 1870, and having concentrated it until it begins to separate neutral phosphate of lime, I mix it in equivalent proportions most intimately with cream tartar, in the state of powder, and dry it. With this admixture a large part of the potassa of the cream tartar is withdrawn and the tartaric acid set free. The whole yields a body of exceeding pleasant taste, in which the acid strength of the total is not increased above that of the two bodies before mixing, but the tendency to decay of strength which most forms of phosphoric-acid compound have is lessened.

It is a pulverulent body, which may be mixed with starch to give it any desired strength, does not absorb moisture from the air, and is thereby admirably qualified for use as a bread-powder. It differs from the acid prepared with potassa described in my patent of March 29, 1864, No. 42,140, in that it introduces a salt of potassa in common use and easily procured in purity.

What I claim as my invention, and desire to secure by Letters Patent, is—

A non-hygroscopic pulverulent compound, for use in making bread and other farinaceous food, composed of a mixture of an acid phosphate and cream tartar, substantially as set forth.

In testimony whereof I have signed my name to this specification before two subscribing witnesses.

E. N. HORSFORD.

Witnesses:
EBENEZER ROBY,
CHAS. L. RICHARDS.